July 5, 1960
R. A. BUB
2,943,700
ZIGZAG FILTER BLANK AND METHOD OF MAKING A FILTER
Filed April 27, 1959
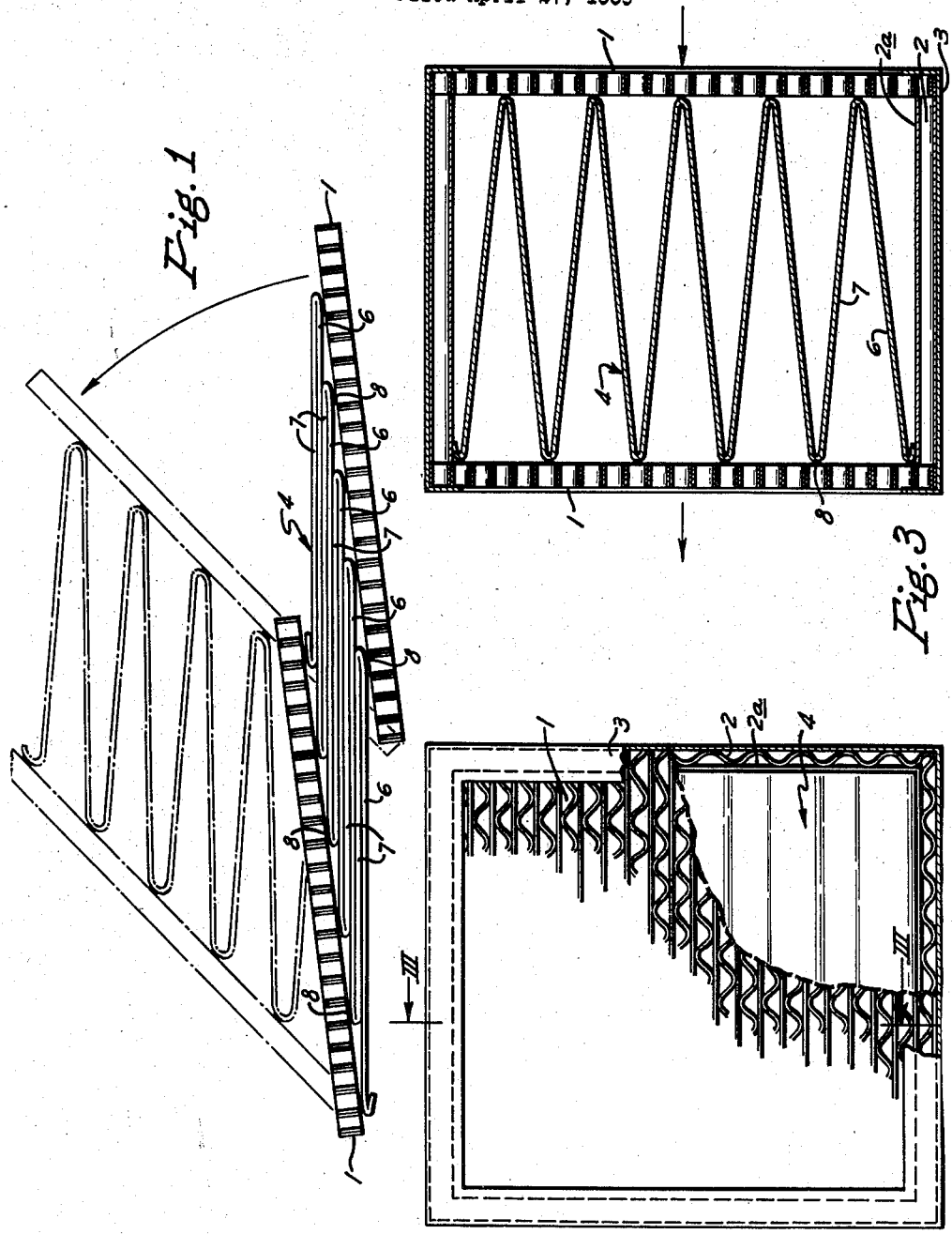
INVENTOR.
ROBERT A. BUB
BY
Brown, Critchlow, Flick & Peckham
His Attorneys

2,943,700
ZIGZAG FILTER BLANK AND METHOD OF MAKING A FILTER

Robert A. Bub, Penn Hills, Pa., assignor to Mine Safety Appliances Company, Pittsburgh, Pa., a corporation of Pennsylvania Filed Apr. 27, 1959, Ser. No. 809,290

2 Claims. (Cl. 183—71)

This invention relates to filters, and more particularly to those containing zigzag filter elements It is among the objects of this invention to provide a method of making a filter, in which a zigzag filter element of any desired size can be quickly and easily connected to its supports while the filter element is in a compressed form, in which the blank thus formed can then be quickly expanded to operative position, and in which light weight filters of any desired size are produced inexpensively and without separators  Another object is to provide a blank, from which a filter can readily be made.

In accordance with this invention a filter strip is folded back and forth upon itself to form a stack of rectangular layers  Alternate layers have the same length and are arranged in stepped relation, while the intermediate layers have a uniform but shorter length. Grids then are placed across the ends of the layers in parallel planes inclined to the layers. Simultaneously or immediately thereafter, the grids are secured to the long layers of the strip near their opposite ends along parallel lines that extend across the strip alternately on its opposite sides at uniformly spaced intervals. The grids can then be swung into parallel position opposite each other to spread the various layers apart in order to produce a zigzag filter element composed of sheets, all having substantially the same length. The space between the edges of the two grids can then be closed by a suitable wrapping to form a box-like filter.

The preferred embodiment of the invention is illustrated in the accompanying drawing, in which Fig. 1 is a side view of the filter blank;

Fig. 2 is a view of one face of the complete filter, with part of the rear grid broken away; and Fig. 3 is a transverse section through the filter, taken on the line III—III of Fig. 2.

Referring to Figs. 2 and 3 of the drawings, the finished filter is a box-like unit having two opposite sides formed from grids, by which is meant fairly rigid perforated sheets. These grids 1 may be made in any suitable manner, but preferably they are formed from narrow parallel strips that are spaced apart by corrugated strips glued thereto. The various strips may be made of any suitable material, heavy paper or asbestos being examples. The other four walls of the box can be formed conveniently from single-faced corrugated paperboard 2, which includes a flat sheet 2a, and engages the inner faces of the grids at their margins and spaces the grids apart. The grids and the intermediate side walls are all held together by a paper or cloth wrapping 3 that extends around paperboard 2 and projects beyond the edges of the grids far enough to permit folding over the outer faces of the grids sufficiently to overlie the opposite edges of the paperboard wrapping. Outer wrapping 3 is glued in place. Secured to the inner surfaces of the two grids is a zigzag filter element 4.

It is a feature of this invention that the filter element 4 is connected in collapsed or compressed form to the grids, and that the blank thus produced is then expanded so that the grids will be opposite each other and the filter element will be in operative position. Accordingly, as shown in Fig. 1, a strip of suitable filter material is folded back and forth upon itself to form a stack of rectangular layers in face-to-face engagement with one another. Adjoining layers, however, have different lengths, there being one group of layers having one length and another group having a different length. The longer layers 6, which are all the same length, alternate with the shorter layers 7, which also have a uniform length. The longer layers are arranged in stepped relation, whereby the intermediate layers necessarily are stepped also. The drawing shows steps along the left-hand side of the folded strip and inverted steps along the opposite side.

The two grids 1 are laid across the ends of the layers in the stack in parallel planes that are inclined to the layers. This is, the grids are placed across the steps, to the flat areas of which they are secured inwardly from the folds. Thus, the grids will be fastened only to the long layers, one grid to one side of a long layer, and the other grid to the opposite side of the same layer. The shorter the short layers, the further in form the folds will be the lines of attachment of the long layers to the grids, although it is not necessary that the lines of attachment at one end of the layers be the same distance from the adjacent folds as the opposite end of the layers. However, it is very important that the lines of attachment be spaced uniformly along the filter strip and that they extend across only the long layers. The grids may be attached to the filter strip by various means, but preferably by cementing.

There are various ways of determining where the lines of adhesive should be located on the stack of layers, but once that has been decided, they can be applied mechanically to the stacks by using a jig or stencil. One way of making the initial determination, which will serve to illustrate the method, is to mark parallel guide lines of attachment across a filter strip before it is folded. Such lines should extend across the strip alternately on its opposite sides at uniformly spaced intervals that are equal to the length of the filter sheets to be produced. When the strip is folded as shown, with two lines on each long layer 6 and only near its opposite ends, each long layer will have a line on one side at one end and on the opposite side at the other end. Obviously, no lines will appear on the short layers 7. Such guide lines are not shown in the drawing, but their positions are indicated by the narrow bands 8 of adhesive that may be applied to the filter layers along the guide lines. It also will be seen that all of the bands along each grid are equally spaced apart. Of course, there are other ways of determining where the adhesive lines should be located, which may be cheaper than the method just described.

After the grids have been attached to the folded filter strip in this manner, the two grids are swung apart as far as possible, which will bring their ends into common parallel planes. At the same time, as indicated in dotted lines in Fig. 1, the layers of the folded strip will be separated as the strip is expanded  As the grids are spread apart, the long layers 6 will become shorter and the short layers 7 will become longer, because the folded portions of the strip projecting outward beyond the adhesive bands will be straightened out and become part of the shorter layers. By the time the grids are as far apart as possible and the various filter layers have been spread evenly, as shown in Fig. 3, the zigzag filter element thus produced will be formed from sheets all having substantially the same length because bands 8 are spaced uniformly along the strip and uniformly across the grids. The corrugated wrapping 2, to which adhesive has been applied, then is wrapped around the filter element between the grids and is enclosed in the paper wrapping 3 to complete the filter.

An advantage of this invention is that the grids can be attached to the filter strip after it has been folded and while it is still in the form of a compact or solid stack of filter layers. At that time it is much easier to handle than after it has been expanded. Another advantage is the absence of separators between the filter sheets. My filter is easy and inexpensive to make, and it can readily be produced in any size by merely varying the length and/or breadth of the filter strip from which the element is folded. There is no frame of fixed size; the grids and wrappings being readily available in all sizes to correspond to the size of the filter element.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In the method of making a filter, the steps comprising folding a filter strip back and forth upon itself to form a stack of rectangular layers of which alternate layers have the same length and are arranged in stepped relation and the intermediate layers have a uniform but shorter length, placing grids across the ends of said layers in parallel planes inclined to the layers, securing the grids to the long layers near their opposite ends along parallel lines extending across the strip alternately on its opposite sides at uniformly spaced intervals, and swinging the grids into parallel position opposite each other to spread said layers apart to produce a zigzag filter element formed from sheets all having substantially the same length.

2. A filter blank comprising a filter strip folded back and forth upon itself and forming a stack of rectangular layers, alternate layers having the same length and arranged in stepped relation, the intermediate layers having a uniform but shorter length, grids inclined to said layers in parallel planes and extending across the ends of the layers, and fastening means extending across said strip alternately on opposite sides thereof at uniformly spaced intervals and securing it to said grids along parallel lines, said fastening means being located only on each long layer near its opposite ends, at least one of said fastening means on each long layer being spaced from the adjacent end of that layer, whereby the grids can be swung into parallel position opposite each other to spread said layers apart to form a zigzag filter element composed of sheets all having substantially the same length.

References Cited in the file of this patent

UNITED STATES PATENTS

| 2,099,598 | Carter | Nov. 16, 1937 |
| 2,206,684 | Yant | July 2, 1940 |
| 2,586,078 | O'Malley | Feb. 19, 1952 |

FOREIGN PATENTS

| 874,638 | France | May 18, 1942 |